United States Patent
Foelster et al.

(12) 
(10) Patent No.: US 6,375,881 B1
(45) Date of Patent: Apr. 23, 2002

(54) PROCESS FOR MAKING A PLASTIC MATERIAL

(75) Inventors: Thomas Foelster, Grafenau; Ralph Greiner, Leonberg; Dirk Schaefer, Ulm, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/367,347

(22) PCT Filed: Feb. 11, 1998

(86) PCT No.: PCT/EP98/00757
§ 371 Date: Oct. 26, 1999
§ 102(e) Date: Oct. 26, 1999

(87) PCT Pub. No.: WO98/36024
PCT Pub. Date: Aug. 20, 1998

(30) Foreign Application Priority Data

Feb. 12, 1997 (DE) .......................... 197 05 280

(51) Int. Cl.⁷ .............................. B29B 9/06; C08J 3/20; C08J 5/04
(52) U.S. Cl. ....................... 264/141; 264/211; 264/320; 264/322; 264/328.18; 264/349
(58) Field of Search ................................ 264/141, 349, 264/211, 320, 322, 328.18

(56) References Cited

U.S. PATENT DOCUMENTS 3,728,294 A  4/1973  Levine
5,663,216 A * 9/1997  Tomka ..................... 523/128
6,184,272 B1 * 2/2001  Foelster et al. ............. 524/47

FOREIGN PATENT DOCUMENTS

| EP | 0 319 589 A1 | 6/1989 |
| GB | 2 090 849 A | 7/1982 |
| WO | WO 95/04106 | 2/1995 |

OTHER PUBLICATIONS

Patent Abstracts of Japan, Publication No. 58180648, Jun. 11, 1982, Takemura Kenji.

Patent Abstracts of Japan, Publication No. 63009511, Jan. 16, 1988, Fujii Yasushi

* cited by examiner

Primary Examiner—Leo B. Tentoni
(74) Attorney, Agent, or Firm—Crowell & Moring LLP

(57) ABSTRACT

A process for the preparation of fiber-reinforced plastic molding includes (1) shortening the fibers to a length of less than 30 mm; (2) introducing the fibers and the plastics present in the solid state, separately from one another, into a mixing chamber of a die press, wherein the plastic is in particulate form; (3) thoroughly mixing the plastic and fibers to give a solids mixture; (4) transporting the solids mixture through die orifices of the die press; (5) heating the solids mixture in the zone before or in the orifices of the die; (6) enclosing at least part or partly embedding the fibers by the plastic during or after the heating of the solids mixture; and (7) comminuting the granulated material for subsequent molding.

22 Claims, 3 Drawing Sheets

PROCESS FOR MAKING A PLASTIC MATERIAL

CROSS-REFERENCE TO RELATED APPLICATION

Ser. No. 09/022,446, which is directed to related subject matter, is incorporated in its entirety herein by reference.

BACKGROUND AND SUMMARY OF INVENTION

The present invention relates to a process for the preparation of a starting material for the subsequent production of a fibre-reinforced plastics moulding, a starting material prepared by the process and a plastics moulding produced from the starting material.

The article entitled: "Werkstoffe im Automobilbau" [Materials in automotive construction] in the German newspaper: Sonderausgabe der Automobiltechnische Zeitung (ATZ) [Special issue of the Automotive Newspaper] discloses a fibre-reinforced plastics moulding which is formed from a plastics matrix and from natural fibres which are embedded in the plastics matrix. To ensure good disposal of the plastics moulding, the plastics matrix consists of so-called biopolymers, which are natural, organic macromolecules and are obtained from renewable raw materials, such as sugar beets, potatoes, maize or cellulose (including wastepaper). Natural fibres are defined as those fibres which are obtained as renewable raw materials in nature. Plastics mouldings formed in this manner are safely biodegraded on disposal since all their organic constituents rot and are converted into water, $CO_2$, humus and biomass as well as bacteria and moulds in the rotting cycle, the $CO_2$ formed during the rotting being neutral in the ecological balance since it was in fact previously withdrawn from the atmosphere by the renewable raw materials.

Plastics in which pliable or flexible fibres, in particular natural fibres, are incorporated in a plastics matrix comprising synthetic and/or biological polymers generally have a poor distribution of the fibres, i.e. the fibres are generally bundled and have a poor random uniform distribution. Because of this in turn, the stability of these plastics mouldings is very low. Furthermore, owing to the damage to the fibres during shaping, the average fibre length is also very limited.

It is the object of the invention to provide a process for the preparation of a starting material with which, in a shaping process known per se, such as injection moulding, pressure die-casting, flow moulding and the like, it is subsequently possible to produce economical plastics mouldings having pliable fibres, in particular natural fibres, incorporated in a plastics matrix, the stability of which mouldings is improved. Furthermore, it is the object of the invention to propose a starting material and a corresponding plastics moulding.

The object is achieved by a process according to the present invention. As a result of the dry-blending of the polymer or of the polymers and of the pliable fibres to give a solids mixture and the subsequent at least partial embedding of the fibres in the heated polymer or the heated polymers, the fibres are to a high degree thinly and randomly uniformly distributed in the starting material. Furthermore, in the case of the starting material according to the invention and also in the case of a plastics moulding produced therefrom, the average fibre length is longer compared with mouldings to date. If a moulding is produced from such a starting material by, for example, injection moulding or compression moulding, the corresponding moulding then also has the fibres distributed singly and very uniformly, with the result that a moulding having good mechanical properties can be produced in an economical manner. Furthermore, in the invention, the proportion of ecologically harmful substances is reduced compared with comparable mouldings of purely synthetic substances by the use of natural fibres.

Further advantageous embodiments of the invention are described in the respective subclaims. Otherwise, the invention is illustrated in more detail with reference to embodiments shown in the figures and six exemplary examples.

DETAILED DESCRIPTION OF THE DRAWINGS

Figure 1:
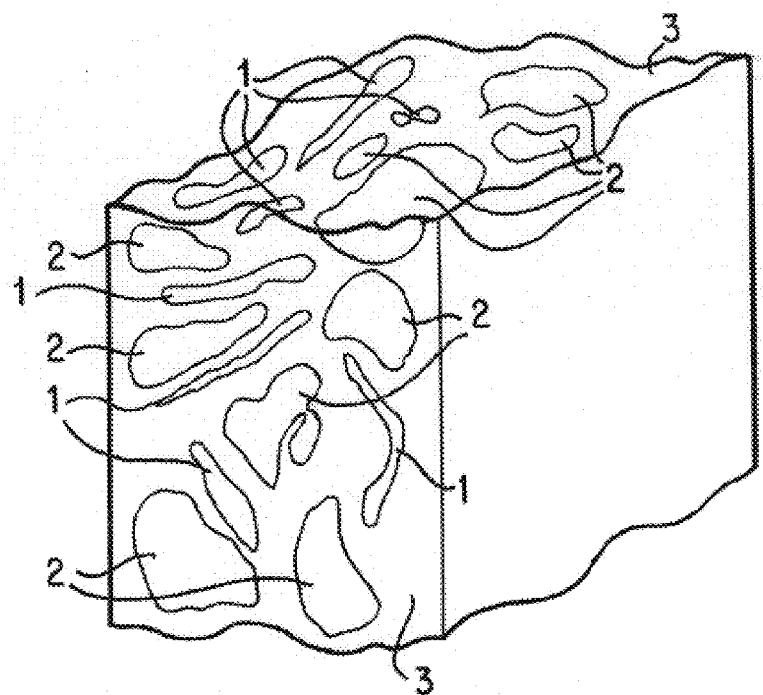
FIG. 1 shows a section through a sheet-like plastics moulding.

FIG. 1 shows the fundamental internal structure of a fibre-reinforced plastics moulding according to the invention. The plastics moulding has a plastics matrix in which arranged natural fibres 1 are uniformly distributed. The plastics matrix itself comprises two polymers which are mixed with one another and one of which is a biopolymer 2 and the other a polymer 3 at least substantially resistant to biological stresses. However, the resistant polymer 3 is itself usefully also a plastic which is itself a renewable raw material, or at least the starting materials of said plastic are renewable raw materials.

For the biopolymer 2, in particular the use of thermoplastic and/or granular starch is expedient. For the resistant polymer 3, it is useful to employ a thermoplastic polymer, the following substances being particularly advantageous: polyurethane (PU) and/or polyamide (PA) and/or cellulose and/or a cellulose derivative and/or cellulose propionate and/or PA 11 and/or PA 610 and/or PA 669 and/or a PA based on azelaic acid and/or a thermoplastic PU with a polyol component of renewable raw materials and/or a cellulose ether ester.

In the case of a matrix comprising synthetic plastics, the following materials are also useful: thermoplastic polyolefins, thermoplastic polyesters, thermoplastic polyurethanes and in this case preferably polyethylenes, polyamides and particularly preferably polypropylenes.

In the case of a cellulose ether ester as resistant polymer 3, it is useful to employ a cellulose ether ester having a high degree of substitution, since this is at least substantially resistant biologically.

In an expedient manner, the biopolymer 2 forms a disperse phase in the plastics matrix while the resistant polymer 3 forms a continuous phase, the resistant polymer 3 at least substantially, preferably completely, enclosing the disperse phase.

When thermoplastic starch is used for the plastics matrix, the starch can be digested with customary plasticizers, such as, in particular, glycerol and/or urea and/or fructic acid, for better processing.

The possible production of a fibre-reinforced plastics moulding according to the invention is described below.

First, in an agglomerator unit from Pallmann, type PFY 250/40 (cf. Tables 1 and 2, samples 1 to 3 and 6), whose cavity plate has a diameter of 280 mm, a thickness of 92 mm and a hole diameter of 3.2 mm, the plastics material preferably present in particulate form and comprising biopolymer 2 and resistant polymer 3, and the natural fibres 1, in the dry state, are introduced separately from one another into the mixing chamber of the annular die press and thoroughly mixed to give a solids mixture. Natural fibres 1 which have an average length of less than 30 mm, preferably less than 20 mm and particularly preferably less than 10 mm are distributed in the plastics material. During the distribution of the natural fibres 1, which are in particular fibres originating from textile processing and appropriately worked up, in the plastics material, said fibres are preferably at least substantially enclosed by the plastics material.

The solids mixture which consists of the plastic/natural fibre mixture and which comprises between 5 and 60% by weight, in particular between 5 and 35% by weight, of natural fibres 1 is then heated to a temperature between 100° C. and 250° C., in particular up to 230° C., for example by means of an agglomerator, with the result that the plastic is plastified at least in parts. As a result of this plastification, the fibres can be enclosed and embedded in the plastic. The processing temperature reached by friction was between 150 and 200° C. here. The throughput was about 150 kg/h, with a bulk density between 490 and 500 g/l.

The heating is usefully effected in the zone before and/or during transport through the orifices of the annular die. The material transported through the orifices is cooled after the orifices and granulated for the preparation of the starting material.

The heated solids mixture is brought into the desired shape by methods known per se, such as, for example, by injection moulding, extrusion and/or compression moulding and the like, and is cooled, with the result that the plastics moulding cures. During the shaping of the plastics moulding at the latest, the biopolymer 2 is at least substantially enclosed by the resistant polymer 3.

For the preparation of the solids mixture, the resistant polymer 3—in the case of the samples 1 to 6 described in the tables, cellulose propionate (CP)—and the biopolymer 2—granular potato starch (samples 1 to 3) or granular thermoplastic starch (in the case of sample 6)—were premixed and were fed to a feed screw via a vibrating channel.

The natural fibres 1 (green flax fibres) were metered via a metering storage container and a discharge screw in the region of the feed screw.

In general, a compact starting material (agglomerator) of relatively uniform size, good cohesion and sufficient homogeneity is prepared by the above method, from which starting material the plastics moulding can then be produced in a customary manner. In the two tables below, such plastics mouldings are denoted by an "A" at the end (cf. samples 1 to 3 and 6).

The advantages of the agglomerator are that no thermal degradation of the plastics and of the fibres takes place, that a free-flowing starting material is produced from a plastic/natural fibre mixture, that the starting material has high strength so that it disintegrates only slightly during further processing and during transport and that the starting material has a low moisture content, if necessary as a result of degassing.

Figure 5:
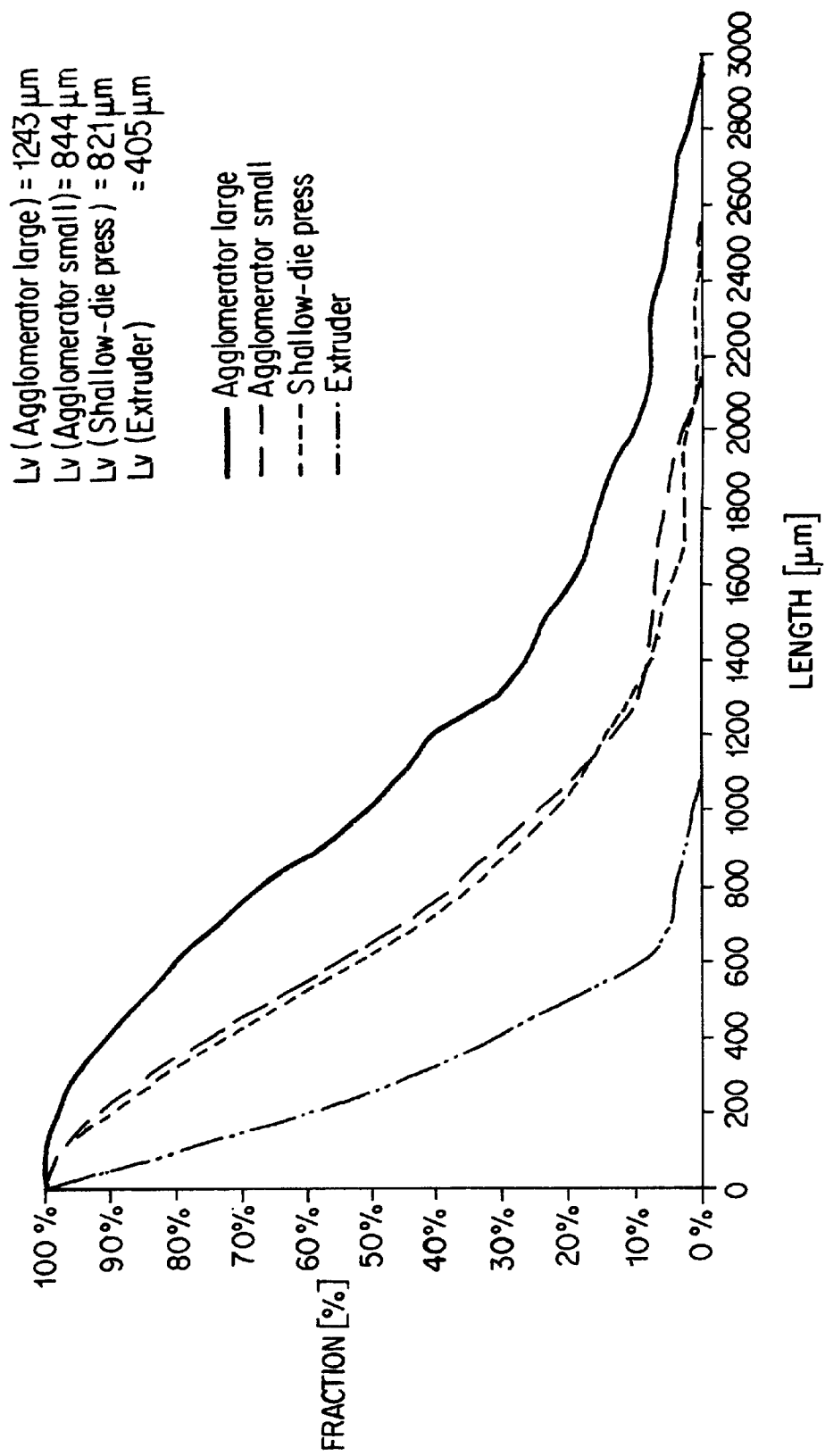

The advantage of the invention with regard to the fibres is evident in particular from the diagram in FIG. 5, which shows the fraction of fibres having an average fibre length in the case of various plastics mouldings produced. In particular, it is found here that the average fibre length is the longest in the case of plastics mouldings which were produced using the starting material according to the invention. Thus, with machines having a comparable output volume, the average fibre length is about 840 $\mu$m in the case of a procedure according to the invention ($2^{nd}$ graph from top), about 820 $\mu$m in the case of a shallow-die press ($2^{nd}$ graph from bottom) and even only about 400 $\mu$m in the case of an extruder (bottom graph).

Preferred uses of plastics mouldings produced by the invention are mouldings for lorries or cars or railway vehicles or aircraft, in particular for the bodywork thereof and/or the cladding thereof.

The shallow-die press, better known by the name "edge mill", was also used in the production of the plastics mouldings. Here, the plastics and the natural fibres 1 are compressed with one another only mechanically and are not plastified. This is a compaction in which the starting material is compressed in such a way that a plastics moulding of sufficient stability and strength forms.

In the two tables below, such plastics mouldings are denoted by a "K" at the end (cf. samples 4–5).

In the two Tables 1 and 2 already mentioned, water absorption and some material properties of plastics mouldings produced according to the invention are stated.

In the case of the individual samples 1 to 6, both the materials used and their percentage composition are stated. For better comparison, the samples 1 to 5 have the same starting materials, except for the different proportion of plasticizers.

There were differences in the mixing ratio and in the preparation of the starting material, which—as mentioned above—was prepared either with the aid of an agglomerator or of a shallow-die press (i.e. a so-called edge mill).

The general nomenclature shown below is used for designating the composition of the samples:

Sample i): Ex/F/FF U:V:W A or K where

E: CP with x% of plasticizer and/or

E: thermoplastic starch (TPS) with x% glycerol (G) as plasticizer,

F: granular potato starch (GPS),

FF: green flax fibres

A: use of an agglomerator

K: use of an edge mill.

TABLE 1

| | | Water absorption in [%] according to DIN 53 495 | | | | |
|---|---|---|---|---|---|---|
| Sample | Composition | 1 h | 2 h | 4 h | 8 h | 24 h |
| 1 | CP10/GPS/FF 70:20:10 A | 0.6 | 0.7 | 1.1 | — | 1.7 |
| 2 | CP10/GPS/FF 60:27:13 A | 0.9 | 1.1 | 1.5 | — | 2.2 |
| 3 | CP10/GPS/FF 50:33:17 A | — | — | — | — | — |
| 4 | CP10/GPS/FF 60:20:20 K | 1.1 | 1.5 | 2.0 | — | 2.7 |
| 5 | CP10/GPS/FF 60:27:13 K | 1.1 | 1.5 | 1.9 | — | 2.7 |

TABLE 1-continued

Water absorption in [%] according to DIN 53 495

| Sample | Composition | 1 h | 2 h | 4 h | 8 h | 24 h |
|---|---|---|---|---|---|---|
| 6 | CP10/TPS20G/FF 43:43:14 A | 1.4 | 2.1 | 2.9 | 4.1 | 7.2 |

TABLE 2

Material properties

| Sample | Composition | Tensile modulus of elasticity according to DIN 53 455 in [N/mm²] | Tensile strength according to DIN 53 445 in [N/mm²] | Impact strength according to DIN 53 453 in [kJ/m] |
|---|---|---|---|---|
| 1 | CP10/GPS/FF 70:20:10 A | 3623 | 41 | 8 |
| 2 | CP10/GPS/FF 60:27:13 A | 4580 | 41 | 8 |
| 3 | CP10/GPS/FF 50:33:17 A | 4357 | 37 | 5 |
| 4 | CP10/GPS/FF 60:20:20 K | 5142 | 36 | 8 |
| 5 | CP10/GPS/FF 60:27:13 K | 4358 | 34 | 8 |
| 6 | CP10/TPS20G/FF 43:43:14 A | 3238 | 29 | 7 |

Figure 2:
FIG. 2 shows a section through sample 2, taken with 500 times magnification using a scanning electron microscope.
Figure 3:
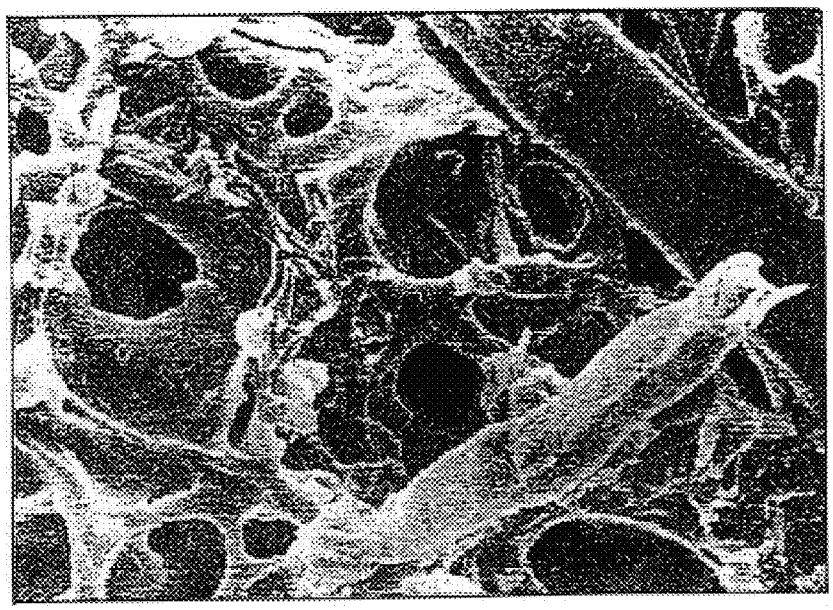
FIG. 3 shows a scanning electron micrograph of a section through sample 5 with 500 times magnification.
Figure 4:
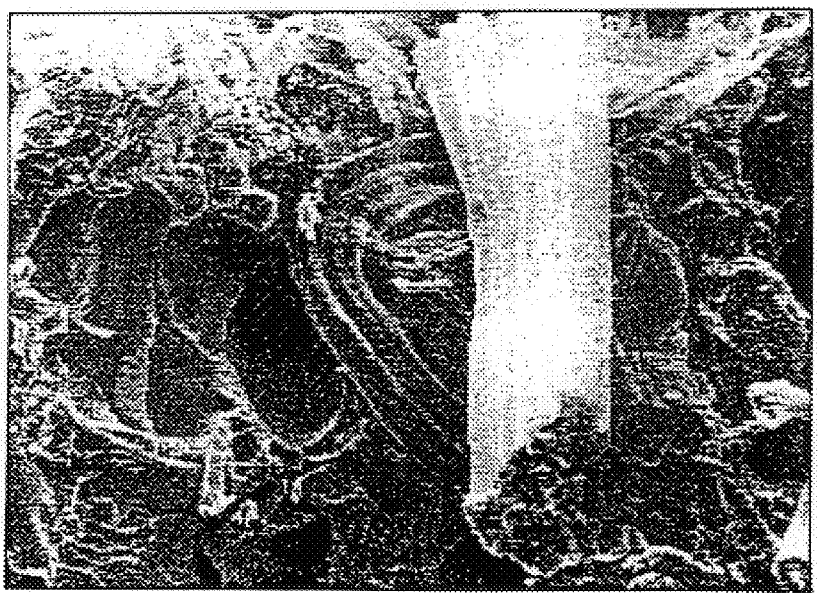
FIG. 4 shows a scanning electron micrograph of a section through sample 6 with 500 times magnification and FIG. 5 shows a diagram of the fraction of the average fibre length for various plastics mouldings produced.

FIGS. 2 to 4 show scanning electron micrographs (SEM) of sections through the samples 2, 5 and 6 with 500 times magnification. Before the micrographs were recorded, the GPS was removed from the region of the section by washing with water, i.e. GPS was present in the indentations, the material relating to visible fibres and no fibres being the resistant polymer, thus being CP in the present case.

The common feature of all micrographs is that they have a uniform distribution of the plastics and the fibres. Furthermore, it is clearly evident that the resistant polymer substantially comprises the biopolymer and the fibres.

Examples 7 to 12 for the preparation of the starting material and of a fibre-reinforced plastics moulding produced therefrom are shown below, the examples having been separated into the individual functionally associated groups:
- specified material for addition to the mixing chamber of the agglomerator,
- processing parameters of the specified material for the preparation of the starting material and
- product properties of a fibre-reinforced plastics moulding produced from the starting material.

EXAMPLE 7

Polypropylene/flax fibres

Specified material:

| | |
|---|---|
| Matrix: | polypropylene from Hoechst, tradename Hostalen PPU O180, powder |
| Fibres: | flax fibres, average fibre length about 2.150 mm |
| Fibre volume fraction: | 30% |

Processing parameters:

| | |
|---|---|
| Processing apparatus: | annular die press |
| Internal diameter: | 120 mm |
| External diameter: | 160 mm |
| Number of holes: | 300 |
| Hole diameter: | 4 mm |
| Blade speed: | 433 min$^{-1}$ |
| Product temperature: | — |
| Throughput: | — |

Product properties:

| | |
|---|---|
| Tensile strength: | 34.5 MPa |
| Tensile modulus of elasticity: | 5.050 MPa |
| Impact strength: | 11.5 kJ/m² |
| Average fibre length: | 830 μm |

EXAMPLE 8

Polypropylene/adhesion promoter/hemp fibres

Specified material:

| | |
|---|---|
| Matrix: | polypropylene from Hoechst, trade name Hostalen PPU O 180, powder |
| Adhesion promoter: | maleic anhydride-modified polypropylene from Hoechst, trade name Hostaprime HC 5, powder |
| Fibres: | hemp fibres, average fibre length about 2.150 mm |
| Amount of adhesion promoter: | 1.5%, based on fibre material |
| Fibre volume fraction: | 40% |

Processing parameters:

| | |
|---|---|
| Processing apparatus: | annular die press |
| Internal diameter: | 120 mm |
| External diameter: | 160 mm |
| Number of holes: | 300 |
| Hole diameter: | 4 mm |
| Blade speed: | 433 min$^{-1}$ |
| Product temperature: | — |
| Throughput: | — |

Product properties:

| | |
|---|---|
| Tensile strength: | 52.5 MPa |
| Tensile modulus of elasticity: | 6.375 MPa |
| Impact strength: | 13 kJ/m² |
| Average fibre length: | 620 μm |

EXAMPLE 9

Polyamide 11/flax fibres

Specified material:

| | |
|---|---|
| Matrix: | polyamide 11 from Elf Atochem, trade name Rilsan B, powder |
| Fibres: | flax fibres, average fibre length about 2.150 mm |
| Fibre volume fraction: | 25% |

-continued

| Polyamide 11/flax fibres | |
|---|---|
| Processing parameters: | |
| Processing apparatus: | annular die press |
| Internal diameter: | 120 mm |
| External diameter: | 160 mm |
| Number of holes: | 300 |
| Hole diameter: | 4 mm |
| Blade speed: | 260 min$^{-1}$ |
| Product temperature: | about 105° C. |
| Throughput: | 30 kg/h |
| Product properties: | |
| Tensile strength: | 52.5 MPa |
| Tensile modulus of elasticity: | 4.050 MPa |
| Impact strength: | 15 kJ/m$^2$ |
| Average fibre length: | 745 μm |

EXAMPLE 10

| Cellulose propionate/flax fibres | |
|---|---|
| Specified material: | |
| Matrix: | cellulose propionate from Albis, trade name Cellidor CP 400-10, granules |
| Fibres: | flax fibres, average fibre length about 2.150 mm |
| Fibre volume fraction: | 26% |
| Processing parameters: | |
| Processing apparatus: | annular die press |
| Internal diameter: | 120 mm |
| External diameter: | 145 mm |
| Number of holes: | 300 |
| Hole diameter: | 3.2 mm |
| Blade speed: | 433 min$^{-1}$ |
| Product temperature: | about 145° C. |
| Throughput: | 30 kg/h |
| Product properties: | |
| Tensile strength: | 52.5 MPa |
| Tensile modulus of elasticity: | 5.475 MPa |
| Impact strength: | 10.5 kJ/m$^2$ |
| Average fibre length: | 775 μm |

EXAMPLE 11

| Cellulose propionate/granular starch/flax fibres | |
|---|---|
| Specified material: | |
| Matrix: | cellulose propionate from Albis, trade name Cellidor CP 400-10, granules |
| Filler: | granular potato starch from Südstärke, trade name Superior |
| Filler weight fraction: | 20% |
| Fibres: | flax fibres, average fibre length about 2.500 mm |
| Fibre volume fraction: | 9% |
| Processing parameters: | |
| Processing apparatus: | annular die press |
| Internal diameter: | 250 mm |

-continued

| Cellulose propionate/granular starch/flax fibres | |
|---|---|
| External diameter: | 280 mm |
| Number of holes: | — |
| Hole diameter: | 3.2 mm |
| Blade speed: | 700 min$^{-1}$ |
| Product temperature: | about 175° C. |
| Throughput: | — |
| Product properties: | |
| Tensile strength: | 41 MPa |
| Tensile modulus of elasticity: | 3.625 MPa |
| Impact strength: | 10.5 kJ/m$^2$ |
| Average fibre length: | 1.245 μm |

EXAMPLE 12

| Cellulose propionate/flax fibres | |
|---|---|
| Specified material: | |
| Matrix: | cellulose propionate from Eastman, trade name Tenite Propionate 360-16, powder |
| Fibres: | flax fibres, average fibre length about 2.500 mm |
| Fibre volume fraction: | 26% |
| Processing parameters: | |
| Processing apparatus: | shallow-die press |
| Die diameter: | 175 mm |
| Number of holes: | — |
| Hole diameter: | 4 mm |
| Blade speed: | 100 min$^{-1}$ |
| Product temperature: | about 110° C. |
| Throughput: | 19 kg/h |
| Product properties: | |
| Tensile strength: | 32 MPa |
| Tensile modulus of elasticity: | 3.910 MPa |
| Impact strength: | 15.5 kJ/m$^2$ |
| Average fibre length: | 820 μm |

In the above examples, it is found, particularly on the basis of Example 12, that the throughput has to be substantially reduced in the processes not according to the invention if it is desired to obtain a comparable average fibre length.

Preferred uses of plastics mouldings according to the invention are mouldings for lorries or cars or railway vehicles or aircraft, in particular for the bodywork thereof and/or the trim thereof.

Although the embodiments describe plastics matrices with synthetic and/or biological polymers, a plastics moulding according to the invention may also have only synthetic polymers. In this case, the mouldings can be particularly economically produced.

What is claimed is:

1. A process for the preparation of a plastic material for molding, comprising:

shortening a plurality of fibers to a length of less than 30 mm;

introducing the fibers and a plastic in particulate form, separately from one another, into a mixing chamber of a die press;

thoroughly mixing the plastic and the fibers to form a solids mixture;

transporting the solids mixture through a die of the die press having die orifices;

heating the solids mixture before or during the transporting through the die orifices, wherein the plastic of the solids mixture is at least partly plastified and/or at least partly softened by the heating;

enclosing or embedding at least part of the fibers in the plastic during or after the heating and before emerging from the die orifices; and comminuting or granulating the material from the die to form the plastic material for molding.

2. A process for preparing a fiber-reinforced plastic molding, comprising:

shortening a plurality of fibers to a length of less than 30 mm;

introducing the fibers and a plastic in particulate form, separately from one another, into a mixing chamber of a die press;

thoroughly mixing the plastic and the fibers to form a solids mixture;

transporting the solids mixture through a die of the die press having die orifices;

heating the solids mixture before or during the transporting through the die orifices, wherein the plastic of the solids mixture is at least one of partly plastified or partly softened by the heating;

enclosing or embedding at least part of the fibers in the plastic during or after the heating and before emerging from the die orifices;

comminuting or granulating the material from the die to form a fiber-reinforced plastic material for molding; and molding the fiber-reinforced plastic material by injection molding, extrusion, or compression molding.

3. A process according to claim 1, wherein the plastic is a synthetic plastic.

4. A process according to claim 1, wherein the fibers and the plastic are introduced in a dry state into the mixing chamber of the die press.

5. A process according to claim 1, wherein the fibers and the plastic are introduced into the mixing chamber of an annular die press.

6. A process according to claim 1, wherein the fibers are shortened to a length of less than 20 mm.

7. A process according to claim 1, wherein the fibers are shortened to a length of less than 10 mm.

8. A process according to claim 1, wherein the plastic of the solids mixture is at least partly softened by the heating.

9. A process according to claim 1, further comprising adding natural fibers to the solids mixture.

10. A process according to claim 1, wherein the solids mixture comprises between 5 and 50% by weight of the fibers.

11. A process according to claim 1, wherein the solids mixture comprises between 10 and 35% by weight of the fibers.

12. A process according to claim 1, wherein the solids mixture comprises between 15 and 30% by weight of the fibers.

13. A process according to claim 1, wherein the heating of the solids mixture is to a temperature of 100° C. to 250° C.

14. A process according to claim 13, wherein the heating is to a temperature of 100° C. to 230° C.

15. A process according to claim 1, wherein the solids mixture is dry-blended in the mixing chamber.

16. A process according to claim 1, further comprising cooling the material transported through the die prior to comminuting to give a granulated plastic material.

17. A process according to claim 1, wherein the thoroughly mixed solids mixture is transported before or up to the die of the die press before being heated.

18. A process according to claim 1, wherein the plastic comprises a plastic selected from the group consisting of a synthetic plastic and a biopolymer of renewable raw materials.

19. A process according to claim 19, wherein the fibers are fibers originating from textile processing.

20. A process according to claim 19, wherein the fibers from textile processing are worked up before being introduced into the mixing chamber.

21. A process according to claim 19, wherein the fibers originating from textile processing are cut before being fed into the mixing chamber.

22. A process according to claim 19, wherein the fibers originating from textile processing are freed from foreign substances before being fed into the mixing chamber.

* * * * *